(12) United States Patent
Warner et al.

(10) Patent No.: US 7,461,504 B2
(45) Date of Patent: Dec. 9, 2008

(54) METHOD AND SYSTEM FOR CONTROLLING TEMPERATURES OF EXHAUST GASES EMITTED FROM INTERNAL COMBUSTION ENGINE TO FACILITATE REGENERATION OF A PARTICULATE FILTER

(75) Inventors: Oliver A. Warner, Brighton, MI (US); Admir Kreso, Canton, MI (US); Michael A. Balnaves, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 155 days.

(21) Appl. No.: 11/018,314

(22) Filed: Dec. 21, 2004

(65) Prior Publication Data

US 2006/0130459 A1    Jun. 22, 2006

(51) Int. Cl.
 *F01N 3/00* (2006.01)
(52) U.S. Cl. ............... 60/286; 60/274; 60/295; 60/300; 60/311; 123/90.15
(58) Field of Classification Search ............ 60/274, 60/284, 286, 295, 297, 300, 303, 311; 123/198 F, 123/481, 90.11, 90.15
See application file for complete search history.

(56) References Cited

U.S. PATENT DOCUMENTS

| | | | |
|---|---|---|---|
| 4,391,095 A * | 7/1983 | Virk | ............... 60/286 |
| 4,677,823 A | 7/1987 | Hardy | |
| 4,719,751 A | 1/1988 | Kume et al. | |
| 4,730,455 A | 3/1988 | Pischinger et al. | |
| 4,747,264 A | 5/1988 | Santiago et al. | |
| 4,897,096 A | 1/1990 | Pischinger et al. | |
| 5,028,405 A | 7/1991 | Erdmannsdoerfer et al. | |
| 5,042,248 A | 8/1991 | Abthoff et al. | |
| 5,044,158 A | 9/1991 | Goerlich | |
| 5,557,923 A | 9/1996 | Bolt et al. | |
| 5,826,425 A | 10/1998 | Sebastiano et al. | |
| 5,930,992 A * | 8/1999 | Esch et al. | ............... 60/274 |
| 5,956,944 A | 9/1999 | Dementhon et al. | |
| 6,176,896 B1 | 1/2001 | Dementhon et al. | |
| 6,304,815 B1 | 10/2001 | Moraal et al. | |
| 6,347,513 B2 | 2/2002 | Pfleger et al. | |
| 6,349,707 B1 | 2/2002 | Neumann et al. | |
| 6,374,812 B1 | 4/2002 | Wiese | |
| 6,397,584 B2 | 6/2002 | Salvat et al. | |
| 6,510,685 B2 * | 1/2003 | Bolz et al. | ............... 60/285 |
| 6,519,933 B2 * | 2/2003 | Ogiso et al. | ............... 60/285 |
| 6,560,959 B2 * | 5/2003 | Katsuta et al. | ............... 60/284 |
| 6,574,956 B1 | 6/2003 | Moraal et al. | |
| 6,615,577 B2 | 9/2003 | Meyer et al. | |

(Continued)

FOREIGN PATENT DOCUMENTS

JP     59-77025 A     5/1984

(Continued)

*Primary Examiner*—Tu M Nguyen
(74) *Attorney, Agent, or Firm*—Brooks Kushman P.C.

(57) ABSTRACT

Method, system, and controller for controlling exhaust gas temperatures by adjusting exhaust valve timing and/or fueling for one or more cylinders wherein normal operating cylinders receive additional fuel to compensate for the adjusted cylinders, thereby increasing exhaust gas temperatures. The method, system, and controller may be applicable in systems having an engine which emits exhaust gases having particulates which are captured by the particulate filter.

1 Claim, 1 Drawing Sheet

U.S. PATENT DOCUMENTS

| | | | |
|---|---|---|---|
| 6,615,580 B1 | 9/2003 | Khair et al. | |
| 6,622,480 B2 | 9/2003 | Tashiro et al. | |
| 6,632,764 B2 | 10/2003 | Druckhammer et al. | |
| 6,666,020 B2 | 12/2003 | Tonetti et al. | |
| 6,679,050 B1 * | 1/2004 | Takahashi et al. | 60/285 |
| 6,698,192 B2 | 3/2004 | Ootake | |
| 6,708,487 B2 | 3/2004 | Morimoto et al. | |
| 6,722,120 B2 | 4/2004 | Plote | |
| 6,735,941 B2 | 5/2004 | Saito et al. | |
| 6,742,328 B2 | 6/2004 | Webb et al. | |
| 6,742,331 B2 | 6/2004 | Minami | |
| 6,756,904 B2 | 6/2004 | Kinugawa et al. | |
| 6,758,039 B2 | 7/2004 | Kuboshima et al. | |
| 6,769,246 B2 | 8/2004 | Strohmaier et al. | |
| 6,817,174 B1 | 11/2004 | Igarashi et al. | |
| 6,823,661 B2 * | 11/2004 | Minami | 60/285 |
| 6,826,905 B2 * | 12/2004 | Gui et al. | 60/295 |
| 6,904,752 B2 * | 6/2005 | Foster et al. | 60/295 |
| 2001/0010152 A1 | 8/2001 | Tallec et al. | |
| 2002/0033017 A1 | 3/2002 | Bruggemann et al. | |
| 2002/0112472 A1 | 8/2002 | Tashiro et al. | |
| 2002/0128146 A1 | 9/2002 | Druckhammer et al. | |
| 2002/0157383 A1 | 10/2002 | Bouchez et al. | |
| 2002/0178922 A1 | 12/2002 | Ohno et al. | |
| 2002/0189235 A1 | 12/2002 | Meyer et al. | |
| 2002/0194843 A1 | 12/2002 | Ootake | |
| 2003/0029427 A1 | 2/2003 | Esteghlal | |
| 2003/0033800 A1 | 2/2003 | Tonetti et al. | |
| 2003/0089102 A1 | 5/2003 | Colignon et al. | |
| 2003/0089103 A1 | 5/2003 | Hahn et al. | |
| 2003/0106303 A1 | 6/2003 | Plote | |
| 2003/0106308 A1 | 6/2003 | Gabe et al. | |
| 2003/0115858 A1 | 6/2003 | Hahn et al. | |
| 2003/0124031 A1 | 7/2003 | Dionnet et al. | |
| 2003/0126858 A1 | 7/2003 | Strohmaier et al. | |
| 2003/0136117 A1 | 7/2003 | Megas | |
| 2003/0140623 A1 | 7/2003 | Ootake | |
| 2003/0145581 A1 | 8/2003 | Tashiro et al. | |
| 2003/0145582 A1 | 8/2003 | Bunting et al. | |
| 2003/0172644 A1 | 9/2003 | Minami | |
| 2003/0182936 A1 | 10/2003 | Kitahara | |
| 2003/0188518 A1 | 10/2003 | Itoyama et al. | |
| 2003/0188527 A1 | 10/2003 | Patterson et al. | |
| 2003/0200745 A1 | 10/2003 | van Nieuwstadt et al. | |
| 2003/0200746 A1 | 10/2003 | Saito et al. | |
| 2003/0209010 A1 | 11/2003 | Arnold | |
| 2003/0213235 A1 | 11/2003 | Kitahara et al. | |
| 2003/0221421 A1 | 12/2003 | Gui et al. | |
| 2003/0221423 A1 | 12/2003 | Kosaka et al. | |
| 2003/0230060 A1 | 12/2003 | Yahata et al. | |
| 2003/0230076 A1 | 12/2003 | Kwon | |
| 2003/0230077 A1 | 12/2003 | Kuboshima et al. | |
| 2003/0230078 A1 | 12/2003 | Yahata et al. | |
| 2003/0230079 A1 | 12/2003 | Kuboshima et al. | |
| 2004/0000139 A1 | 1/2004 | Kawashima et al. | |
| 2004/0011030 A1 | 1/2004 | Braun et al. | |
| 2004/0020194 A1 | 2/2004 | Nishimura et al. | |
| 2004/0031262 A1 | 2/2004 | Gui et al. | |
| 2004/0055279 A1 | 3/2004 | Plote et al. | |
| 2004/0074225 A1 | 4/2004 | Schaller et al. | |
| 2004/0098977 A1 | 5/2004 | Kupe et al. | |
| 2004/0098979 A1 | 5/2004 | Hammerle et al. | |
| 2004/0103648 A1 | 6/2004 | Opris et al. | |
| 2004/0103654 A1 | 6/2004 | Ohtake et al. | |
| 2004/0134187 A1 | 7/2004 | Inoue et al. | |
| 2004/0139729 A1 | 7/2004 | Taylor, III et al. | |
| 2004/0139733 A1 | 7/2004 | Koga et al. | |
| 2004/0144069 A1 | 7/2004 | Gabe et al. | |
| 2004/0144083 A1 | 7/2004 | Ament | |
| 2004/0144087 A1 | 7/2004 | Kondou et al. | |
| 2004/0159097 A1 | 8/2004 | Uematsu et al. | |
| 2004/0172935 A1 | 9/2004 | Otake et al. | |

FOREIGN PATENT DOCUMENTS

| | | |
|---|---|---|
| JP | 61-28709 A | 2/1986 |
| JP | 2001-336440 A | 12/2001 |
| WO | WO 03/048533 A1 | 6/2003 |

* cited by examiner

METHOD AND SYSTEM FOR CONTROLLING TEMPERATURES OF EXHAUST GASES EMITTED FROM INTERNAL COMBUSTION ENGINE TO FACILITATE REGENERATION OF A PARTICULATE FILTER

BACKGROUND OF THE INVENTION

1. Field of the Invention

The present invention relates to systems and methods for controlling temperatures of exhaust gases emitted from an internal combustion engine to facilitate regeneration of a particulate filter.

2. Background Art

A particulate filter is a device for capturing particulates emitted in exhaust gases from a combustion engine. In some systems employing a particulate filter, it may be desired to oxidize or burn the captured particulates in a process commonly referred to as regeneration. This is desirable to reduce the restriction of the particulate filter on the exhaust flow and thus maximize the engine fuel economy. The regeneration of the particulate filter is dependent on temperatures at the particulate filter, which may be influenced either directly or indirectly by exhaust gas temperatures.

Accordingly, a need exists to control exhaust gas temperatures at the particulate filter so as to facilitate regeneration of the particulate filter.

SUMMARY OF THE INVENTION

One non-limiting aspect of the present invention relates to controlling exhaust gas temperatures by adjusting exhaust valve timing and fueling for one or more cylinders in an engine and providing additional fueling to normal operating cylinders so as to compensate for the loss of power and additional load from the cylinders with altered valve events such that engine speed or ouput torque remain unchanged, thereby increasing exhaust gas temperatures.

In accordance with one non-limiting aspect of the present invention, a controller may be configured to determine a desired exhaust temperature and to control engine valve actuation and fuel injection mechanisms accordingly so as to emit exhaust gases at the desired exhaust gas temperature. For example, the controller may be configured to correlate to the desired exhaust gas temperature with those necessary for regeneration of a particulate filter such that the engine may be controlled to emit exhaust gases sufficient to facilitate regeneration of the particulate filter.

In accordance with one non-limiting aspect of the present invention, a valve mechanism may be configured for operation with the engine so as to facilitate controlling engine valve timing in order to control exhaust gas temperatures. For example, the valve mechanism may be configured to control exhaust valve events, and thereby, exhaust gas temperatures, such as by opening the exhaust valve during a compression stroke so as to force one or more of these cylinders to act as a pump and thereby increase loads and required fueling on the other cylinders but without affecting engine speed or output power; by delaying exhaust valve opening during a compression or even the exhaust stroke so as to cause the cylinder gases to compress further and thereby increase in temperatures, temperature of the expelled gases can be controlled by the exhaust valve timing; and/or by opening the exhaust valve during an expansion stroke following fuel ignition so that cylinder gases are expelled through the exhaust valve before normal expansion occurs and while the combusted gases are still at elevated temperatures.

In accordance with one non-limiting aspect of the present invention, an fuel injection mechanism may be configured for operation with the engine so as to facilitate controlling fuel quantity and/or timing to cylinders independently in order to control exhaust gas temperatures. For example, the injection mechanism may be configured to prevent fueling of one more cylinders and to increase fueling to the fueled cylinders such that the unfueled cylinders act as loads on the fuel cylinders, thereby increasing exhaust gas temperatures while engine speed and/or output power is maintained. More over, such control may be integrated with the aforementioned valve timing control such that one or more cylinders may include both valve timing control and fuel injection control for the purpose of controlling exhaust temperatures.

The above features and advantages, along with other features and advantages of the present invention, are readily apparent from the following detailed description of the invention when taken in connection with the accompanying drawings.

DETAILED DESCRIPTION OF THE PREFERRED EMBODIMENT(S)

Figure 1:
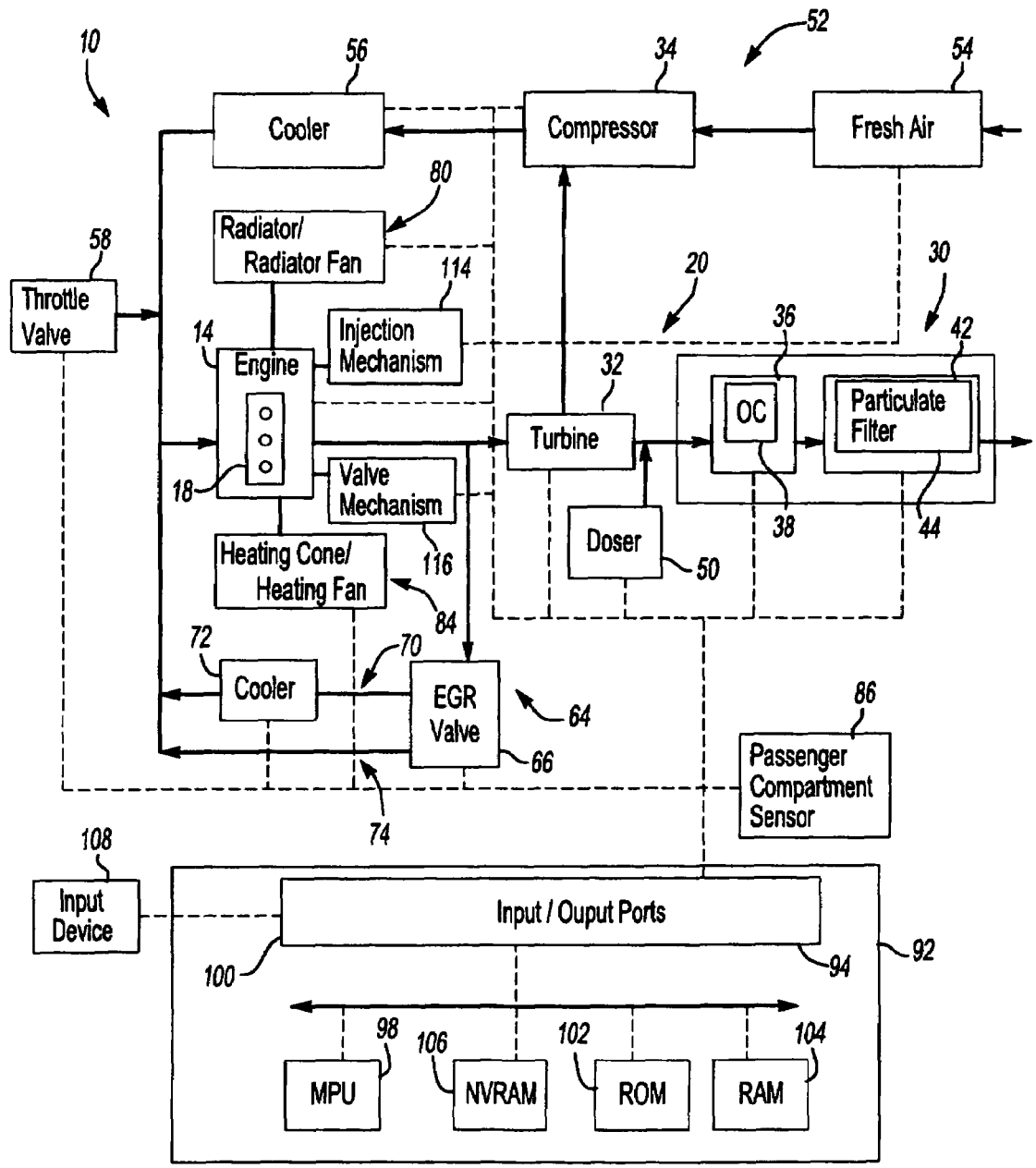
FIG. 1 illustrates a vehicle powertrain system in accordance with one non-limiting aspect of the present invention.

FIG. 1 illustrates a vehicle powertrain system 10 in accordance with one non-limiting aspect of the present invention. The system 10 may provide power for driving any number of vehicles, including on-highway trucks, construction equipment, marine vessels, stationary generators, automobiles, trucks, tractor-trailers, boats, recreational vehicle, light and heavy-duty work vehicles, and the like.

The system 10 may be referred to as an internal combustion driven system wherein fuels, such as gasoline and diesel fuels, are burned in a combustion process to provide power, such as with an spark or compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example. It should be noted, however, that the present invention is not limited to a particular type of engine or fuel.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally, the system 20 may include a turbocharger proximate the exhaust manifold for compressing fresh air delivery into the engine 14. The turbocharger, for example, may include a turbine 32 and a compressor 34, such as a variable geometry turbocharger (VGT) and/or a turbocompound power turbine. Of course, the present invention is not limited to exhaust systems having turbochargers or the like.

The particulate filter assembly 30 may be configured to capture particulates associated with the combustion process. In more detail, the particulate filter assembly 30 may include an oxidation catalyst (OC) canister 36, which in includes an OC 38, and a particulate filter canister 42, which includes a particulate filter 44. The canisters 36, 42 may be separate components joined together with a clamp or other feature such that the canisters 36, 42 may be separated for servicing and other operations. Of course, the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the OC canister 36 or substrate 38 and that the particulate filter 44 may be located in other portions of the exhaust system 20, such as upstream of the turbine 32.

The OC 38, which for diesel engines is commonly referred to as a diesel oxidation catalyst, may oxidize hydrocarbons and carbon monoxide included within the exhaust gases so as to increase temperatures at the particulate filter 44. The particulate filter 44 may capture particulates included within the exhaust gases, such as carbon, oil particles, ash, and the like, and burn the captured particulates if temperatures associated therewith are sufficiently high. In accordance with one non-limiting aspect of the present invention, one object of the particulate filter assembly 30 is to capture harmful carbonaceous particles included in the exhaust gases and to store these contaminates until temperatures at the particulate filter 44 favor oxidation of the captured particulates into a gas that can be discharged to the atmosphere.

The OC and particulate filter canisters 36, 42 may include inlets and outlets having defined cross-sectional areas with expansive portions therebetween to store the OC 38 and particulate filter 44, respectively. However, the present invention contemplates that the canisters 36, 42 and devices therein may include any number configurations and arrangements for oxidizing emissions and capturing particulates. As such, the present invention is not intended to be limited to any particular configuration for the particulate filter assembly 30.

To facilitate oxidizing the capture particulates, a doser 50 may be included to introduce fuel to the exhaust gases such that the fuel reacts with oxygen facilitated by the catalyst in the OC 38 and combusts to increase temperatures at the particulate filter 44, such as to facilitate regeneration. Elevated exhaust gas temperatures at the doser 50 facilitates fuel vaporization and optimal fuel/air delivery to the OC 38. One non-limiting aspect of the present invention is to control the exhaust gas temperature at the doser 50. The amount of fuel injected from the doser may be controlled as a function of temperatures at the particulate filter 44 and other system parameters, such as air mass flow, EGR temperatures, and the like, so as to control regeneration. However, the present invention also contemplates that fuel may be included within the exhaust gases through other measures, such as by controlling the engine 14 to emit fuel with the exhaust gases.

An air intake system 52 may be included for delivering fresh air from a fresh air inlet 54 through an air passage to an intake manifold for introduction to the engine 14. In addition, the system 52 may include an air cooler or charge air cooler 56 to cool the fresh air after being compressed by the compressor 34. Optionally, a throttle intake valve 58 may be provided to control the flow of fresh air to the engine 14. The throttle valve 58 may be a manually or electrically operated valve, such as one which is responsive to a pedal position of a throttle pedal operated by a driver of the vehicle. There are many variations possible for such an air intake system and the present invention is not intended to be limited to any particular arrangement. Rather, the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The EGR system 64 may selectively introduce a metered portion of the exhaust gasses into the engine 14. The EGR system 64, for example, may dilute the incoming air charge and lower peak combustion temperatures to reduce the amount of oxides of nitrogen produced during combustion. The amount of exhaust gas to be recirculated may be controlled by controlling an EGR valve 66 and/or in combination with other features, such as the turbocharger. The EGR valve 66 may be a variable flow valve that is electronically controlled. There are many possible configurations for the controllable EGR valve 66 and embodiments of the present invention are not limited to any particular structure for the EGR valve 66.

The EGR system 64 in one non-limiting aspect of the present invention may include an EGR cooler passage 70, which includes an exhaust gas cooler 72, and an EGR non-cooler bypass 74. The EGR valve 66 may be provided at the exhaust manifold to meter exhaust gas through one or both of the EGR cooler passage 70 and bypass 74. Of course, the present invention contemplates that the EGR system 64 may include more or less of these features in various sequences along the EGR flow path and other features for recycling exhaust gas. Accordingly, the present invention is not intended to be limited to any one EGR system and contemplates the use of other such systems, including more or less of these features, such as an EGR system having only one of the EGR cooler passage or bypass.

A cooling system 80 may be included for controlling the engine 14 temperature by controlling coolant flow and/or temperature therethrough. The coolant may be sufficient for fluidly conducting away heat generated by the engine 14, such as through a radiator. The radiator may include a number of fins through which the coolant flows to be cooled by air flow through an engine housing and/or generated by a radiator fan directed thereto as one skilled in the art will appreciated. It is contemplated, however, that the present invention may include more or less of these features in the cooling system 80 and the present invention is not intended to be limited to the exemplary cooling system described above.

The engine cooling system 80 may operate in conjunction with a vehicle heating system 84. The heating system 84 may include a heating cone, a heating fan, and a heater valve. The heating cone may receive heated coolant fluid from the engine 14 through the heater valve so that the heating fan, which may be electrically controllable by occupants in a passenger area or cab of a vehicle, may blow air warmed by the heating cone to the passengers. For example, the heating fan may be controllable at various speeds to control an amount of warmed air blown past the heating cone whereby the warmed air may then be distributed through a venting system to the occupants. Optionally, sensors and switches 86 may be included in the passenger area to control the heating demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module, may be included in the system 10 to control various operations of the engine 14 and other system or subsystems associated therewith, such as the sensors in the exhaust, EGR, intake, coolant, lubrication, and air conditioning systems. Various sensors may be in electrical communication with the controller via input/output ports 94. The controller 92 may include a microprocessor unit (MPU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information therebetween. The device 108 may be used to change values within the computer readable storage media, such as configuration settings, calibration variables, instructions for EGR, intake, and exhaust systems control and others.

The system 10 may include an injection mechanism 114 for controlling fuel and/or air injection for the cylinders 18. The injection mechanism 114 may be controlled by the controller 92 or other controller and comprise any number of features, including features for injecting fuel and/or air into a common-rail cylinder intake and a unit that injects fuel and/or air into each cylinder individually. For example, the injection mechanism 114 may separately and independently control the fuel and/or air injected into each cylinder such that each cylinder may be separately and independently controlled to receive varying amounts of fuel and/or air or no fuel and/or air at all. Of course, the present invention contemplates that the injection mechanism 114 may include more or less of these features and is not intended to be limited to the features described above.

The system 10 may include a valve mechanism 116 for controlling valve events of the cylinders 18, such as to control air flow into and exhaust flow out of the cylinders 18. The valve mechanism 116 may be controlled by the controller 92 or other controller and comprise any number of features, including features for selectively and independently opening and closing cylinder intake and/or exhaust valves. For example, the valve mechanism 116 may include a compression brake mechanism that controls the exhaust valve of one or more cylinders such that the exhaust valves may be opened during the compression stroke as well as the normal exhaust stroke and thus be capable of controlling exhaust temperature according to the method of this invention. Of course, the present invention contemplates that the valve mechanism may include more or less of these features and is not intended to be limited to the features described above.

In operation, the controller 92 receives signals from various engine/vehicle sensors and executes control logic embedded in hardware and/or software to control the system 10. The computer readable storage media may, for example, include instructions stored thereon that are executable by the controller 92 to perform methods of controlling all features and sub-systems in the system 10. The program instructions may be executed by the controller in the MPU 98 to control the various systems and subsystems of the engine and/or vehicle through the input/output ports 94. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof.

In one non-limiting aspect of the present invention, the controller 92 may be the DDEC controller available from Detroit Diesel Corporation, Detroit, Mich. Various other features of this controller are described in detail in a number of U.S. patents assigned to Detroit Diesel Corporation. Further, the controller may include any of a number of programming and processing techniques or strategies to control any feature in the system 10. Moreover, the present invention contemplates that the system may include more than one controller, such as separate controllers for controlling system or sub-systems, including an exhaust system controller to control exhaust gas temperatures, mass flow rates, and other features associated therewith. In addition, these controllers may include other controllers besides the DDEC controller described above.

One non-limiting aspect of the present invention relates to controlling the engine 14 to emit exhaust gases at the desired exhaust gas temperature to facilitate regeneration. For example, the present invention contemplates controlling engine operation as a function of a difference between the desired exhaust gas temperature and current exhaust gas temperatures so as to raise the exhaust gas temperatures to the desired exhaust gas temperatures, such as to facilitate regeneration of the particulate filter, and to maintain the increased exhaust gas temperatures if needed. The control thereof may be instigated according to software included on the controller 92 or inputted thereto. Similarly, however, the control may be executed with other logic and other controllers, such as a regeneration system controller or the like.

In accordance with one non-limiting aspect of the present invention, the valve mechanism 116 may be controlled by the controller 92 or other feature to control the exhaust gas temperatures by changing the normal combustion cycle exhaust valve events for one or more cylinders 18 while the injection mechanism 114 is causing the same cylinders 18 to be unfueled. This mode of operation may include shutting off fuel to one or more cylinders and the valve mechanism 116 to open the associated exhaust valves during a compression stroke so as to cause the cylinder to act as a pump, whereby the gas charge is compressed and then discharged into the exhaust system before significant expansion occurs within the cylinder. In order to maintain the engines speed and/or output (shaft) power, the controller 92 must cause the injection mechanism 114 to increase fuel input to the remaining fueled cylinders and compensate for the loss of power due to unfueling the pumping cylinders and the power consumed by the pumping cylinders. In this manner increased fueling of the fired cylinders and the discharge of the hot compressed air from the pumping cylinders increases exhaust temperature. Furthermore, as the exhaust temperature is directly proportional to the number of pumping cylinders, the timing of the exhaust valve opening during the compression stroke, and to the engine speed, since more pumping cycles requires more fuel be put into the fired cylinders and produces more hot compressed air from the pumping cylinders, the present invention contemplates controlling engine exhaust gas temperatures by controlling one or more of these parameters. These control methods apply to the following alternative methods of exhaust valve timing and injector fuel control.

In accordance with one non-limiting aspect of the present invention, the valve mechanism 116 may be controlled to delay opening exhaust valves for one or more fueled or for one or more unfueled cylinders so as to delay opening the exhaust valves relative to typical valve timing during an exhaust stroke. This delay, in turn, causes the trapped exhaust gases to be compressed prior to discharge and once again, the controller 92 must compensate by increasing fueling to the normal cycle cylinders to maintain engine speed and/or output power. This method may be applied whether the cylinder is fueled or not but the delay would typically be longer for the non-fueled case than the fueled case.

In accordance with one non-limiting aspect of the present invention, the valve mechanism 116 may be controlled to advance opening of exhaust valves for one or more cylinders relative to typical valve timing during an expansion stroke. This method requires fuel injection into the aforementioned cylinder so that exhaust temperature is increased due to discharge before normal expansion. The controller must increase fuel to the normal cycle cylinders to compensate for the early exhaust opening cylinders. It is contemplated that this method could provide sufficient exhaust temperatures for regeneration of a suitable particulate filter arrangement that does not need a doser 50 and OC 38.

In accordance with one non-limiting aspect of the present invention, the exhaust gases temperatures emitted from the engine 14 may be controlled by a valve mechanism 116 that includes a combination of variable exhaust valve actuation with variable intake valve actuation. For example, one or more of the cylinders may be selectively controlled according to the following cycle to increase the temperature of the emitted exhaust gases: opening the intake valve normally to induct air during the intake stroke; opening the exhaust valve near the end of the compression stroke and then closing the exhaust valve soon thereafter; opening the intake valve during the normal expansion stroke and then closing the intake valve soon thereafter so as to induct additional cylinder charge; and delaying opening of the exhaust valve in an exhaust stroke to cause compressive heating of the cylinder charge prior to discharge While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling temperatures of exhaust gases emitted from an internal combustion engine to facilitate regeneration of particulates captured with a particulate filter, the method comprising:

controlling exhaust gas temperatures by controlling at least one cylinder of the internal combust engine according to the following four-stroke cycle:

opening and closing the intake valve to induct air during an intake stroke;

opening and closing the exhaust valve near the end of the compression stroke;

opening and closing the intake valve to induct additional air during an expansion stroke; and delaying opening of the exhaust valve in an exhaust stroke.

* * * * *